United States Patent
Eiseman

(10) Patent No.: US 8,584,872 B2
(45) Date of Patent: Nov. 19, 2013

(54) FOLDING UTILITY TRAY

(76) Inventor: Denise Eiseman, Littleton, CO (US)

( * ) Notice: Subject to any disclaimer, the term of this patent is extended or adjusted under 35 U.S.C. 154(b) by 127 days.

(21) Appl. No.: 13/204,408

(22) Filed: Aug. 5, 2011

(65) Prior Publication Data

US 2012/0080393 A1    Apr. 5, 2012

Related U.S. Application Data

(60) Provisional application No. 61/400,927, filed on Aug. 5, 2010.

(51) Int. Cl.
*A47F 5/10* (2006.01)
*A47B 57/42* (2006.01)
*A47B 57/52* (2006.01)

(52) U.S. Cl.
USPC ............... 211/130.1; 211/90.02; 211/149; 211/193; 211/106

(58) Field of Classification Search
USPC .......... 211/130.1, 132.1, 126.6, 149, 193, 211/94.01, 106, 90.01, 90.02, 133.3, 52, 55, 211/104; 108/42, 67, 162, 166, 167, 171; 248/235, 240, 241
See application file for complete search history.

(56) References Cited

U.S. PATENT DOCUMENTS

| | | | | |
|---|---|---|---|---|
| 2,454,575 A * | 11/1948 | Silene | ............................ | 190/17 |
| 2,732,952 A * | 1/1956 | Skelton | ........................ | 211/59.3 |
| 2,772,003 A * | 11/1956 | Volz | ........................... | 211/130.1 |
| 2,958,424 A * | 11/1960 | Bigatti | ........................ | 211/41.5 |
| 2,997,222 A * | 8/1961 | Sperry | ....................... | 211/130.1 |
| 3,161,158 A * | 12/1964 | Lurey | .............................. | 108/2 |
| 3,199,684 A * | 8/1965 | Bradley | ......................... | 211/74 |
| 3,429,546 A * | 2/1969 | Porter | ......................... | 248/486 |
| 3,612,288 A * | 10/1971 | Lesley | ....................... | 211/132.1 |
| 3,612,292 A * | 10/1971 | Nervig | ....................... | 211/184 |
| 3,677,203 A * | 7/1972 | Barrineau | .................... | 108/166 |
| 4,803,930 A * | 2/1989 | Crocoli | ......................... | 108/48 |
| 5,184,737 A * | 2/1993 | Hardy | ............................. | 211/55 |
| 5,188,089 A * | 2/1993 | Hamilton | ....................... | 126/30 |
| 5,257,701 A * | 11/1993 | Edelson | ....................... | 211/149 |
| 5,526,944 A * | 6/1996 | Merl | ......................... | 211/87.01 |
| 5,738,230 A * | 4/1998 | Goldstein | ..................... | 211/149 |
| 5,765,702 A * | 6/1998 | Bustos et al. | ............. | 211/181.1 |
| 6,378,710 B1 * | 4/2002 | Grueneberg | ............... | 211/132.1 |
| 6,607,083 B1 * | 8/2003 | Webb | .......................... | 211/59.2 |
| 7,537,121 B2 * | 5/2009 | Markson et al. | ............. | 206/745 |
| 7,950,335 B1 * | 5/2011 | Almond et al. | ................ | 108/42 |
| 7,954,648 B2 * | 6/2011 | Takashima et al. | .......... | 211/59.3 |
| 2005/0189311 A1* | 9/2005 | Colby et al. | .............. | 211/94.01 |
| 2008/0000858 A1* | 1/2008 | Fenerty | ..................... | 211/90.01 |

* cited by examiner

*Primary Examiner* — Jennifer E Novosad
(74) *Attorney, Agent, or Firm* — Sheridan Ross P.C.

(57) ABSTRACT

An adjustable folding utility tray for removable attachment to a tripod comprising a portable frame with attached collapsing or folding members is provided. The folding utility tray removably attaches to two legs of an easel or tripod. Once the device is positioned at the desired operational height, two slidingly attached arms are adjusted to engage and contact the easel or tripod legs. After use, the device is folded, or collapsed, into a compact size for transport or storage and removed from the easel or tripod.

15 Claims, 9 Drawing Sheets

FOLDING UTILITY TRAY

FIELD OF THE INVENTION

The disclosure relates to a removable folding utility tray for attaching to a tripod and more particularly, but not by way of limitation, to a folding utility tray used by artists, photographers, and others for removable attachment to a tripod.

BACKGROUND

For many years, artists have been practicing the art of painting outdoors or on location, also known as plein-aire painting. Until recently, a standard easel has been a wooden French-style easel, which has folding legs and a box attached thereto for holding supplies such as paint and brushes. The easel and the supply box can be collapsed into a box-shape configuration with a handle. With these types of easels, the position of a palette is dependent on the position of the supply box. Also, these easels, which are available in full or half-box size, are expensive, heavy, awkward, and difficult to transport from one location to another.

Today, lightweight tripod easels are a new addition to an artist's tool box. Many artists prefer the tripod easel, since it is lightweight, portable, and convenient to set up and take down. But, the lack of a level, stable area on the tripod easel for the artist's palette and other tools is its main disadvantage. The present disclosure addresses this problem related to the removable attachment of a folding utility tray to a pair of tripod easel legs.

Photographers, both professional and amateur, employ the use of tripods to stabilize cameras and other devices during a camera's image capturing process. Typically, these tripods are lightweight and can be collapsed into a compact size for storage or transport. However, the compact lightweight tripod does not offer a sufficient working surface where a photographer can safely place special equipment that may be used in the photographic process. For instance, a photographer may carry a light meter, log book, multiple lenses, lens filters, cleaning materials, or other equipment that may require quick access to aid the photographer in capturing the best image or series of images for a given situation. The present disclosure addresses, in accordance with at least some embodiments, a solution by providing an adjustable height utility tray capable of being removably attached to the legs of a photographer's tripod.

In U.S. Pat. No. 6,240,857 to Elizer, the entire contents of which are hereby incorporated herein by reference, a removable shelf is disclosed. The shelf is designed for mounting on only one location on two legs of a tripod easel. The removable shelf includes boot-shaped cutouts and a pair of support arms for attaching the shelf to the tripod legs.

The present disclosure provides unique structure, function and advantages not disclosed in the Elizer patent or any other commercially-available products.

SUMMARY

In view of the foregoing, it is an objective of the present disclosure to provide a portable folding utility tray for adjustable height attachment at various locations along a length of two legs of a tripod. In some embodiments, the folding utility tray is manufactured from lightweight materials (including, but in no way limited to, the following: plastic, composite, fiberglass, carbon fiber, aluminum, titanium, combinations thereof) to increase the portability of the unit. Another embodiment of the folding utility tray uses thin-sectioned material (for example, steel and other metal alloys) incorporating features such as ribs, gussets, and/or stamped/pressed indentations, to provide high-strength and low weight.

Another aspect of the present disclosure is that the folding utility tray can be quickly folded into a compact unit and easily removed from the legs of a tripod for ease in transporting and storage.

Still another aspect of the present disclosure is that the folding utility tray can be used for holding various artists' supplies, painting frame, palette, photographer's supplies, medical and/or surgical accessories, and other items thereon.

These and other aspects will become apparent to those familiar with artists' palettes, art supply holders and boxes, tripod easels, photographer's tripods, and other tripod devices when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description given above and the detailed description of the drawings given below, serve to explain the principles of these embodiments.

Figure 1:
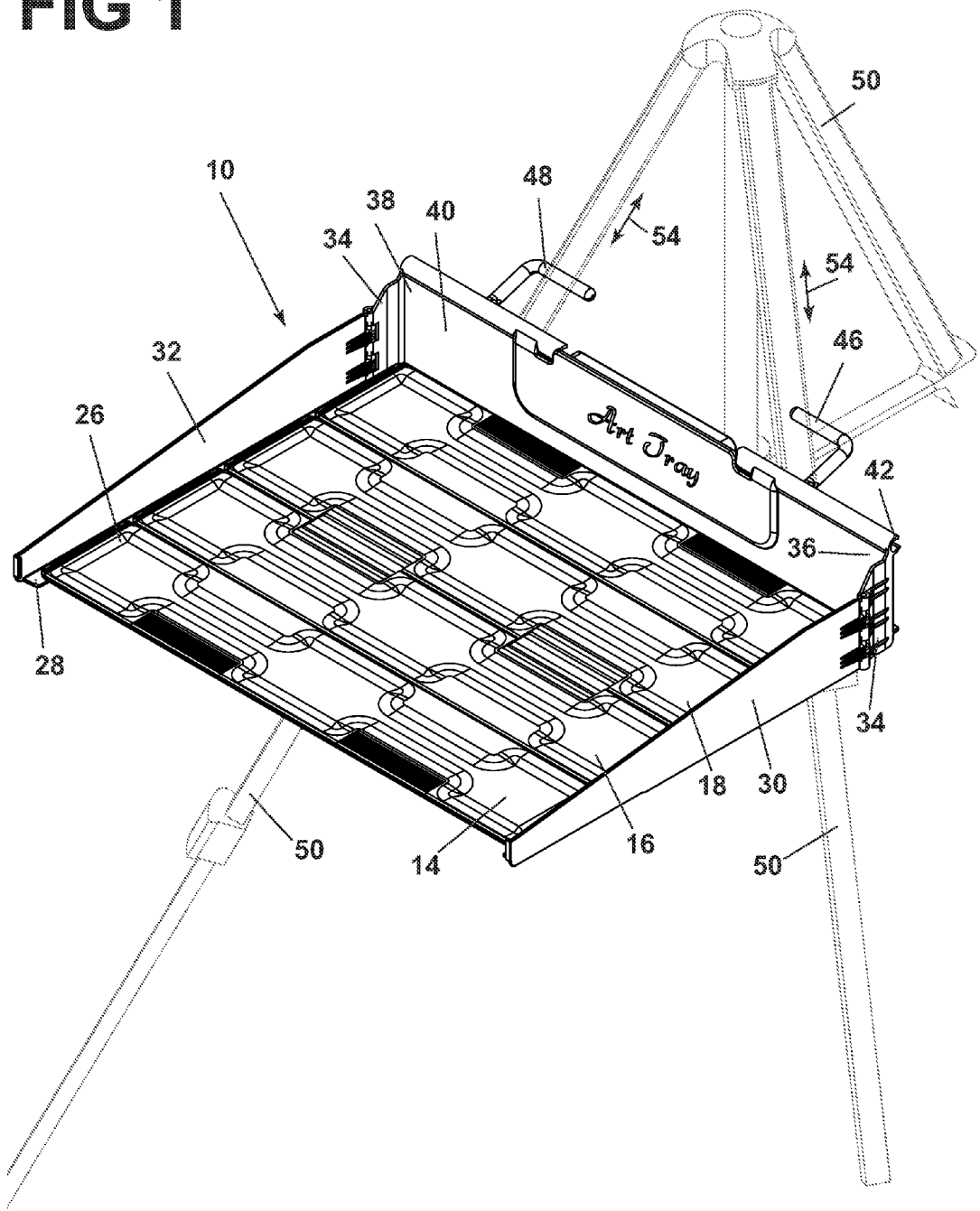
FIG. 1 shows a front perspective view of a folding utility tray in one operating position attached to a tripod.

To assist in the understanding of one embodiment of the present invention the following list of components and associated numbering found in the drawings is provided herein:

| Number | Component Description |
| --- | --- |
| 10 | Folding Utility Tray |
| 12 | Shelf |
| 14 | First Portion |
| 16 | Second Portion |
| 18 | Third Portion |
| 19 | Fourth Portion |
| 20 | Shelf Lip |
| 22 | Artist Palette |
| 24 | First Side |
| 26 | Second Side |
| 28 | Support Lip |
| 30 | First Foldable Shelf Arm |
| 32 | Second Foldable Shelf Arm |
| 34 | Shelf Arm End |
| 36 | First Side |
| 38 | Second Side |
| 40 | Back Plate |
| 42 | Groove |
| 44 | Slide Portion |
| 46 | First L-Shaped Attachment Arm |
| 48 | Second L-Shaped Attachment Arm |
| 50 | Legs of a Tripod |
| 52 | Easel |
| 54 | Arrows |
| 56 | Painting Frame |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

The accompanying drawings illustrate complete embodiments in the present invention according to the best modes presently devised for the practical application of the subject folding utility tray, and in which:

In FIG. 1, a front perspective view of the subject folding utility tray is shown having general reference numeral 10. The folding utility tray 10 includes a shelf 12 divided into a first portion 14 hinged to a second portion 16. The second portion 16 is hinged to a third portion 18. The first, second, and third portions 14, 16, and 18 are designed to fold next to each other, as shown in the drawings.

In one embodiment, the first portion 14 of the shelf 12 includes a shelf lip 20 to prevent an artist palette 22, shown in dashed lines, from falling off of the tray 10. A first side 24 (shown on FIG. 2) and a second side 26 of the foldable shelf 12 rests on a support lip 28 of a first foldable shelf arm 30 and a second foldable shelf arm 32. The first side 24 of the foldable shelf 12 can be seen on FIGS. 2-9.

The foldable shelf arms 30 and 32 each include one end 34 hinged to a first side 36 and a second side 38 of a common surface on the back plate 40. In the rear of the back plate 40 is a groove 42 extending along a length of the plate. The groove 42 is used to receive a slide portion 44 of a first L-shaped attachment arm 46 and a slide portion 44 of a second L-shaped attachment arm 48. The slide portion 44 is shown in FIGS. 8 and 9.

Figure 8:
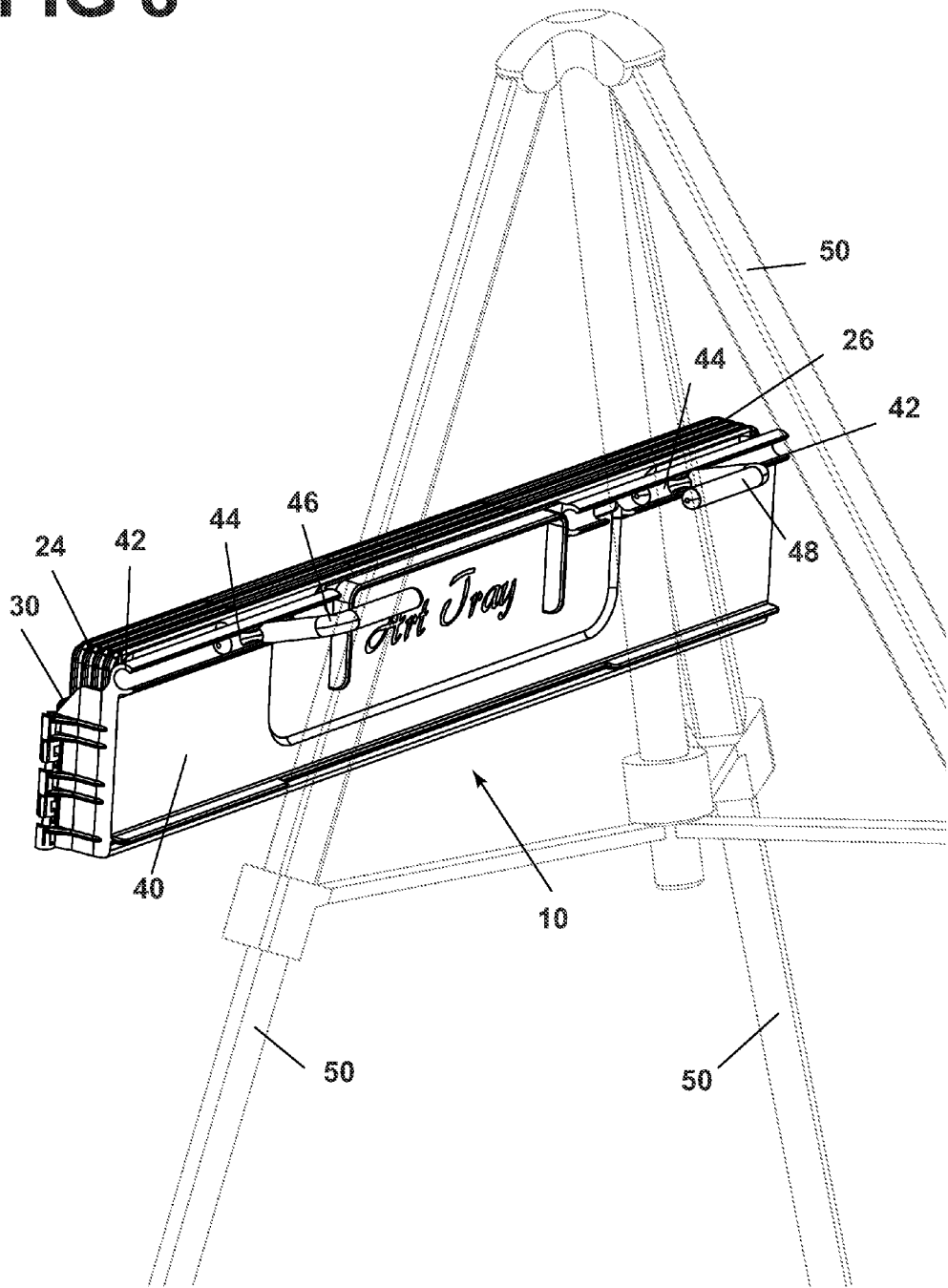
FIG. 8 shows a rear perspective view of a folding utility tray in contact with and removably attached to the legs of a tripod or easel.
Figure 9:
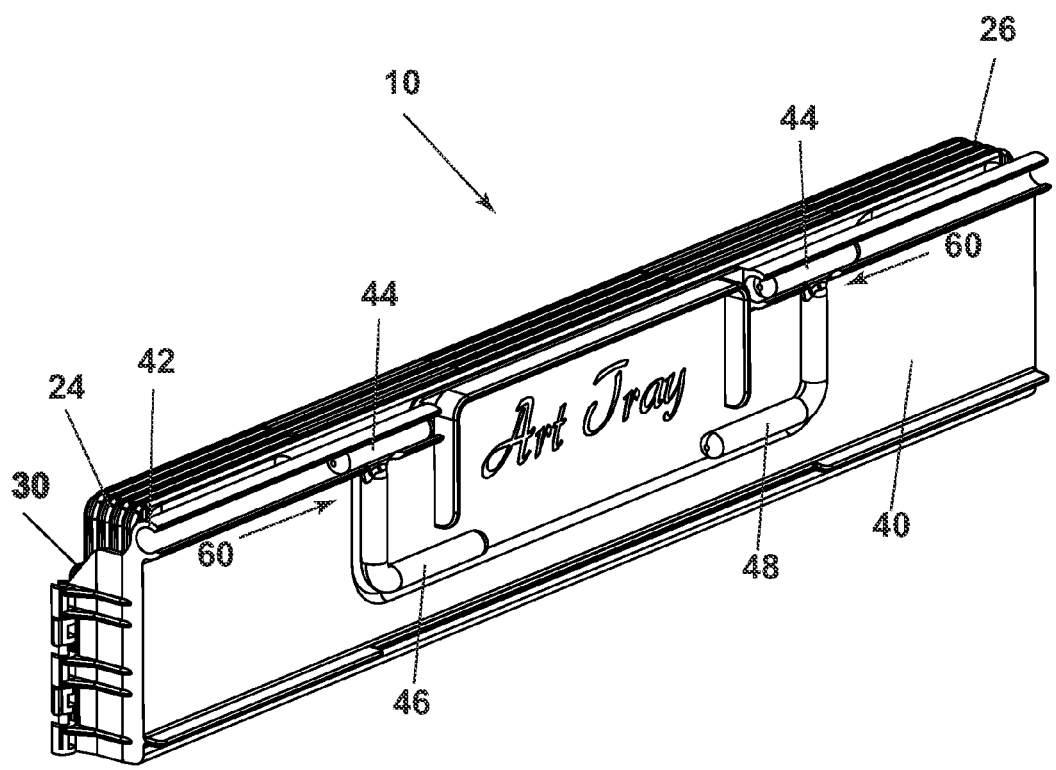
FIG. 9 shows a rear perspective view of a folding utility tray where the tray is fully collapsed to a compact state.

Referring now to FIG. 8, the attachment arms 46 and 48 are shown engaging a portion of two legs 50 of a tripod or easel for holding the folding utility tray 10 thereon. The easel is shown having general reference numeral 52. The tripod legs 50 are shown in dashed lines. The top and bottom of the legs 50 are not shown in this drawing. By adjusting the attachment arms 46 and 48 along the length of the groove 42, the holder 10 can be raised and lowered, as indicated by arrows 54, for adjusting the height of the folding utility tray 10 on the tripod or easel 52. Also shown in this drawing, in dashed lines, is a painting frame 56, that can be held on top of the attachment arms 46 and 48 and rest against a portion of the tripod legs 50 for painting on by an artist using the utility tray 10.

Figure 2:
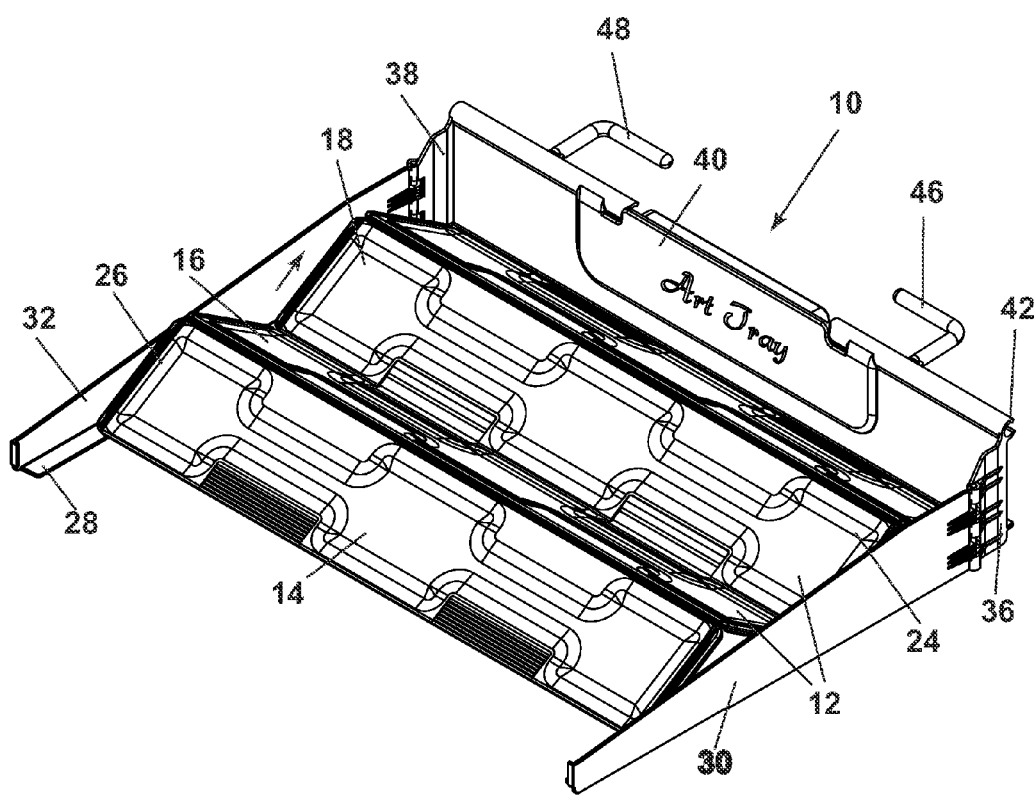
FIG. 2 shows another front perspective view of a folding utility tray where the shelf has been folded to a first folded state.

In FIG. 2, the second portion 16 and the third portion 18 of the shelf 12 have been folded upwardly and the first portion 14 moved rearwardly toward to the back plate 40 by sliding on top of the support lips 28 of the shelf arms 30 and 32. In this drawing, the artist's palette 22 has been removed so that the folding utility tray 10 can be folded for transporting and storage.

It should be mentioned that while the first, second, and third portions 14, 16, and 18 of the shelf 12 are shown in the drawings having a frame-type structure, the shelf 12 can have a solid, mesh surface, or sheet-like structure to prevent items from falling therethrough.

Figure 3:
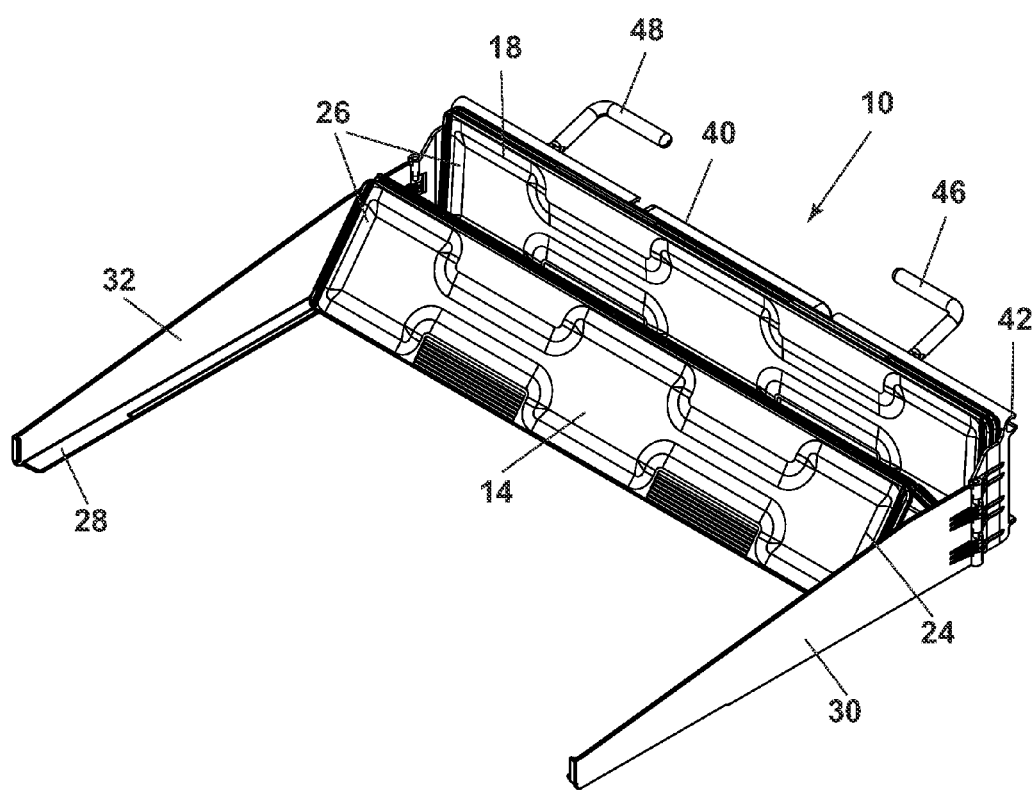
FIG. 3 shows another front perspective view of a folding utility tray where the shelf has been further folded to a second folded state.

In FIG. 3, the second portion 16 has been folded next to the third portion 18 and resting against the front of the back plate 40.

Figure 4:
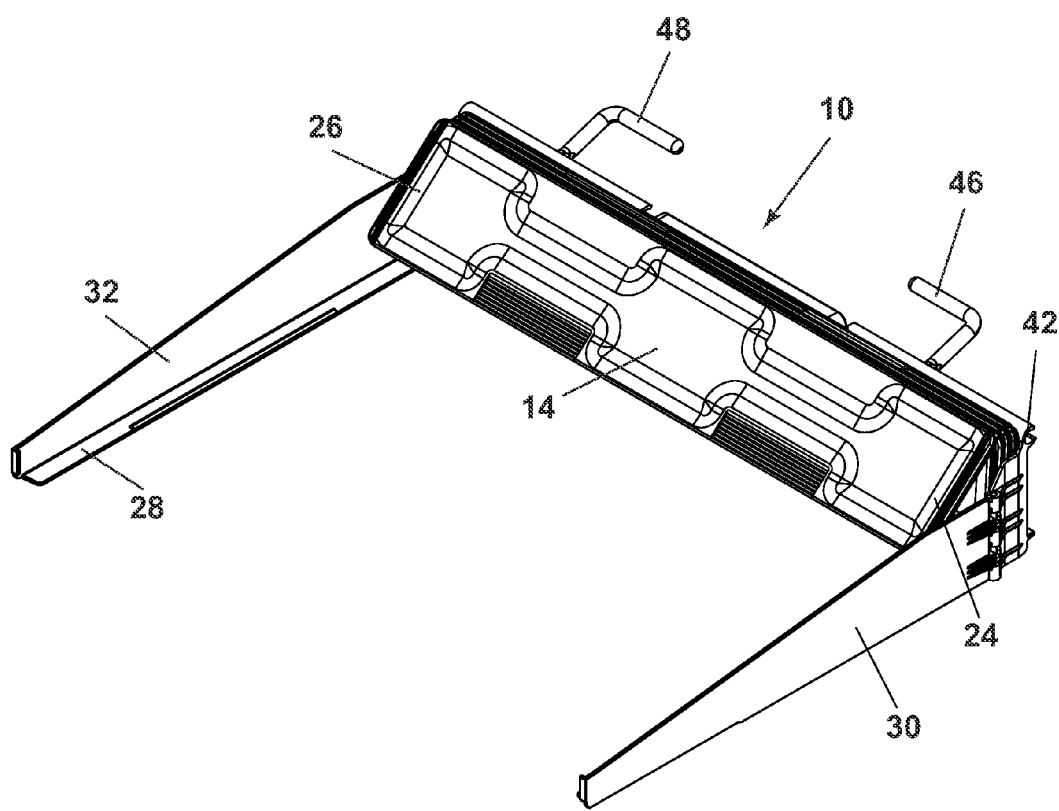
FIG. 4 shows another front perspective view of a folding utility tray where the shelf has been further folded to a third folded state.

In FIG. 4, the first portion 14 has been raised to be placed next to the side of the second portion 16.

Figure 5:
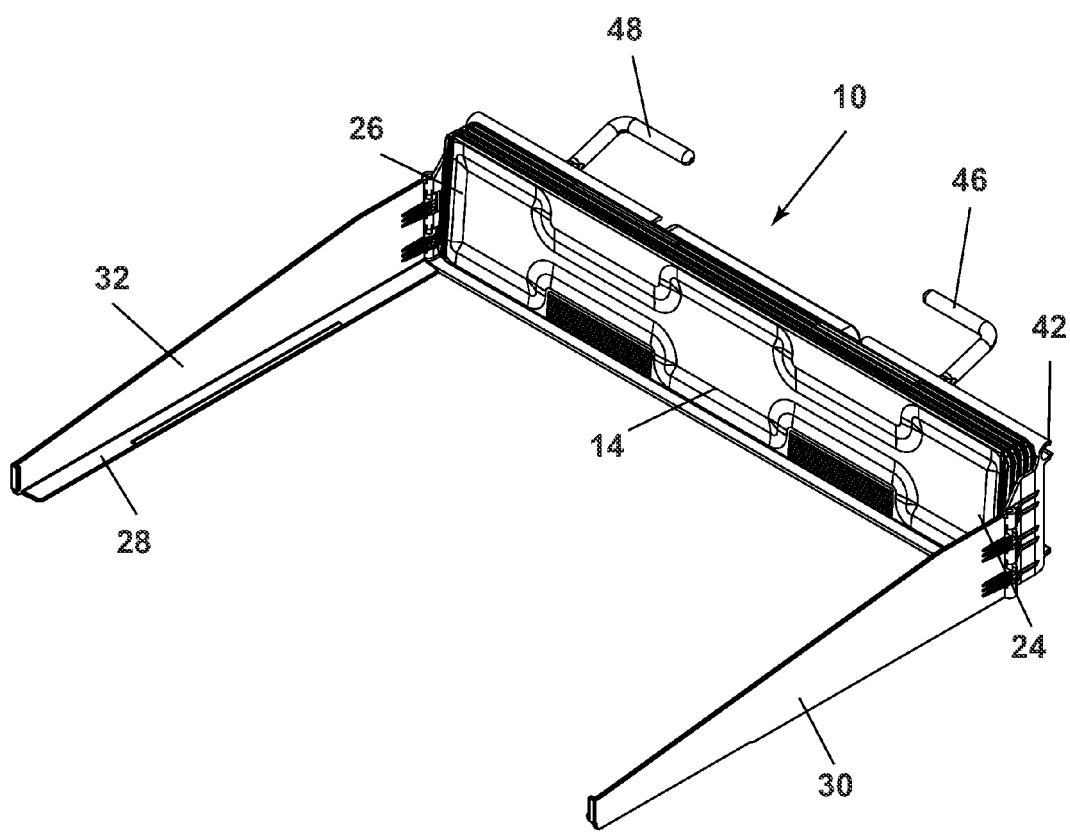
FIG. 5 shows another front perspective view of a folding utility tray where the shelf has been further folded to a completely folded state.

In FIG. 5, the first, second, and third portions, 14, 16, and 18 of the shelf 12 have been folded next to each other and disposed next to the front of the back plate 40. The shelf 12 has now been folded together next to the back plate 40.

Figure 6:
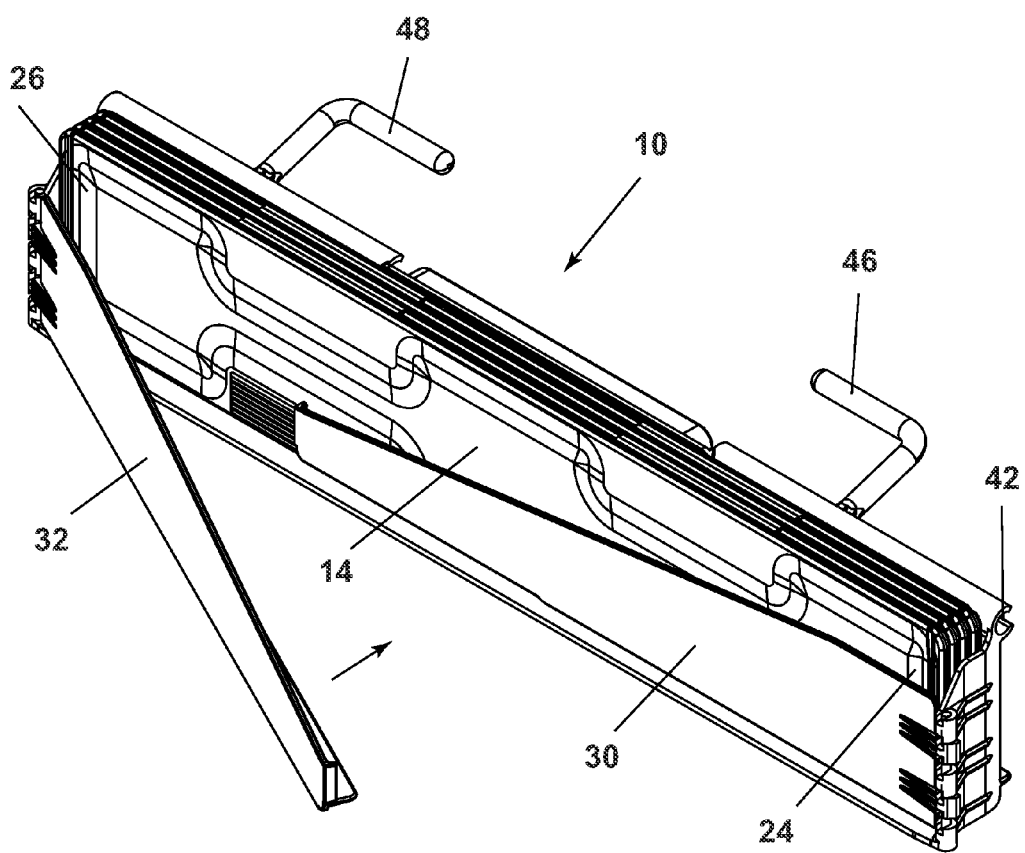
FIG. 6 shows a front perspective view of a folding utility tray where a first foldable shelf arm has been folded to a folded state and the second foldable shelf arm is pivoted toward the folded first foldable shelf arm.

In FIG. 6, the first foldable shelf arm 30 has been folded next to the folded first portion 14 of the shelf 12. Also, the second foldable shelf arm 32 has been pivoted toward the folded first shelf arm 30.

Figure 7:
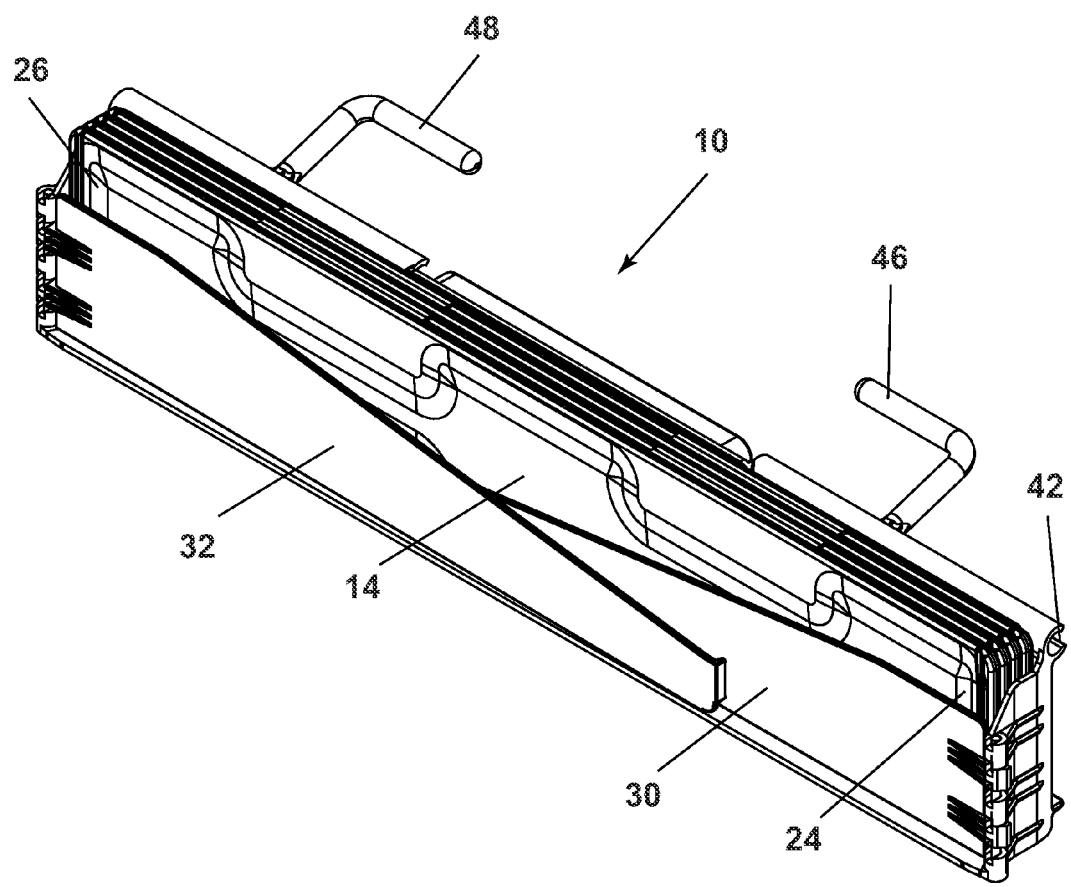
FIG. 7 shows a front perspective view of a folding utility tray where a first foldable shelf arm and a second foldable shelf arm have been folded to a folded state adjacent to the back plate.

In FIG. 7, the first and second foldable shelf arms 30 and 32 have been folded against the side of the first portion 14 of the shelf 12.

In FIG. 8, a rear perspective view of the folding utility tray 10 is shown with the first and second L-shaped attachment arms 46 and 48 engaging a portion of two of the tripod legs 50 and suspending the utility tray 10 thereon. In this drawing, the slide portion 44 of the attachment arms 46 and 48 can be seen riding inside the groove 42. As mentioned above, by adjusting the slide portion 44 along the length of the groove 42, as indicated by arrows 58, the folding utility tray 10 can be placed at various heights on the tripod easel 52 for the convenience of an artist using the folding utility tray 10.

In FIG. 9, the first and second L-shaped attachment arms 46 and 48 have been moved toward each other, as indicated by arrows 60, until the ends of the arms are located adjacent to each other or are in direct contact with each other. The attachment arms 46 and 48 are now folded over and next to the side of the back plate 40, thereby completing the folding of the folding utility tray 10 into a compact unit for ease in storage or transporting. Also, the arms can be unfolded and used as a handle when carrying the folding utility tray 10.

In some embodiments, an alternative embodiment of the folding utility tray 10 is shown. The folding utility tray 10 includes a shelf 12 divided into a first portion 14, hinged to a second portion 16. The second portion 16 is hinged to a third portion 18. The third portion 18 is hinged to a fourth portion 19. The first, second, third, and fourth portions 14, 16, 18, and 19 are designed to fold against each other as shown in the drawings. In accordance with at least one embodiment of the present disclosure, the shelf 12 when folded, forms a substantially planar uninterrupted surface. Additionally, the surfaces of one embodiment of the shelf 12 are solid.

In some embodiments the groove 42 may be interrupted along its length, and the first L-shaped attachment arm 46 is individually adjustable on one length of the groove 42, while the second L-shaped attachment arm 48 is individually adjustable on the other length of the groove 42.

In some embodiments, the first and second L-shaped attachment arms 46 and 48 can be folded into a compact state adjacent to the back plate 40. In one embodiment, the shelf 12 folds in an accordion fashion as shown.

In some embodiments, the folding utility tray 10 may be in a second folded state for transport or storage. The first foldable shelf arm 30 and the second foldable shelf arm 32 are folded adjacent to the folded shelf 12 which is folded adjacent to the back plate 40 (FIG. 1).

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An adjustable folding utility tray, comprising;
a back plate having a first and second side and a groove along a length of the back plate;
a first attachment arm slidingly connected to the groove of the back plate;
a second attachment arm slidingly connected to the groove of the back plate;
a shelf comprising one or more portions, where the portions are rotatably connected to one another, wherein at least one of the one or more portions is connected to the back plate;
a first foldable shelf arm with a proximal end and a distal end, wherein the proximal end is rotatably connected to the first side of the back plate, and the first foldable shelf arm has a first position of use rotated at an angle greater than 5 degrees away from the first face of the back plate and a second position of use adjacent to the back plate;
a second foldable shelf arm with a proximal end and a distal end, wherein the proximal end is rotatably connected to the second side of the back plate, and the second foldable shelf arm has a first position of use rotated at an angle greater than 5 degrees away from the first face of the back plate and a second position of use adjacent to the back plate; and
a first support lip operatively attached to the first foldable shelf arm, wherein the shelf and the one or more portions have a first position of use in contact with the first support lip forming a substantially planar surface and a second position of use in a folded state adjacent to the back plate.

2. The device of claim 1, further comprising;
a second support lip operatively attached to the second foldable shelf arm; and
wherein the shelf and the one or more portions have a first position of use in contact with the second support lip and a second position of use in a folded state adjacent to the back plate.

3. The device of claim 1, wherein the first and second attachment arms are L-shaped.

4. The device of claim 3, wherein the first and second attachment arms are at least partially covered by a polymer material.

5. The device of claim 3 wherein the first and second attachment arms are at least partially covered by a textured material.

6. The device of claim 3 wherein the first and second attachment arms are at least partially textured.

7. The device of claim 1, further comprising;
a shelf lip attached to the shelf and extending in a direction away from the substantially planar surface.

8. An adjustable folding utility tray, comprising;
a back plate having a first and second side and at least one groove along a first face of the back plate;
a first attachment arm slidingly connected to the at least one groove of the back plate;
a second attachment arm slidingly connected to the at least one groove of the back plate;
a shelf comprising one or more foldable portions, where the one or more portions are slidingly connected to one another, and wherein a first of the one or more portions is attached to the back plate;
a first foldable shelf arm with a proximal end and a distal end, wherein the proximal end is rotatably connected to the first face proximate to the first side of the back plate, and the first foldable shelf arm has a first position of use rotated at an angle greater than 5 degrees away from the first face of the back plate and a second position of use adjacent to the back plate;
a second foldable shelf arm with a proximal end and a distal end, wherein the proximal end is rotatably connected to the second side of the back plate, and the second foldable shelf arm has a first position of use rotated at an angle greater than 5 degrees from the first face of the back plate and a second position of use adjacent to the back plate; and
a first support lip operatively attached to the first foldable shelf arm, wherein the shelf and the one or more portions have a first position of use in contact with the first support lip and a second position of use in a folded state adjacent to the back plate.

9. The device of claim 8, further comprising;
a second support lip operatively attached to the second foldable shelf arm; and
wherein the shelf and the one or more portions have a first position of use in contact with the second support lip and a second position of use in a folded state adjacent to the back plate.

10. The device of claim 8, wherein the first and second attachment arms are L-shaped.

11. The device of claim 10, wherein the first and second attachment arms are at least partially covered by a polymer material.

12. The device of claim 10 wherein the first and second attachment arms are at least partially covered by a textured material.

13. The device of claim 10 wherein the first and second attachment arms are at least partially textured.

14. The device of claim 8, further comprising;
a shelf lip attached to the shelf and extending in a direction away from the substantially planar surface.

15. An adjustable folding utility tray assembly, comprising;
- a back plate having a first and second side and a groove along a length of the back plate;
- a first L-shaped attachment arm slidingly connected to the groove of the back plate for contacting a first leg of a tripod or stand where the L-shaped attachment arm is adjusted to contact the leg via at least one side of the L-shaped attachment;
- a second L-shaped attachment arm slidingly connected to the groove of the back plate for contacting a second leg of a tripod or stand where the L-shaped attachment arm is adjusted to contact the leg via at least one side of the L-shaped attachment;
- a first foldable shelf arm with a proximal end and a distal end, wherein the proximal end is hinged to the first face proximate to the first side of the back plate; and
- wherein the first foldable shelf arm has a first position of use rotated at an angle of approximately 90 degrees away from the first face of the back plate and a second position of use adjacent to the back plate;
- a second foldable shelf arm with a proximal end and a distal end, wherein the proximal end is hinged to the first face proximate to the second side of the back plate; and
- wherein the second foldable shelf arm has a first position of use rotated at an angle of approximately 90 degrees away from the first face of the back plate and a second position of use adjacent to the back plate;
- a support lip operatively attached to the first foldable shelf arm;
- a support lip operatively attached to the second foldable shelf arm;
- a shelf comprising one or more portions each portion having an upper surface and a lower surface, where the portions are hinged to one another for folding, and where the shelf and the one or more portions is rotatably connected to the back plate; and
- wherein the shelf has a first operating position where the upper surface of the one or more portions are coplanar to each other forming a substantially planar top surface while the lower surface of the one or more portions contacts at least one support lip and a second position where the one or more portions are folded adjacent to each other and adjacent to the back plate; and
- a shelf lip, extending upward from the substantially planar top surface of the shelf.

* * * * *